US012617704B2

(12) United States Patent (10) Patent No.: US 12,617,704 B2
Woo et al. (45) Date of Patent: May 5, 2026

(54) WATER PURIFIER

(71) Applicant: LG Electronics Inc., Seoul (KR)

(72) Inventors: Su Hye Woo, Seoul (KR); Sang Duck Lee, Seoul (KR); Jong Pil Kim, Seoul (KR); Yu Seung Choi, Seoul (KR); Jin Hyun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 537 days.

(21) Appl. No.: 17/991,031

(22) Filed: Nov. 21, 2022

(65) Prior Publication Data

US 2023/0234872 A1 Jul. 27, 2023

(30) Foreign Application Priority Data

Jan. 26, 2022 (KR) ........................ 10-2022-0011667

(51) Int. Cl.
*C02F 9/20* (2023.01)
*C02F 1/00* (2023.01)
(Continued)

(52) U.S. Cl.
CPC ................ *C02F 9/20* (2023.01); *C02F 1/003* (2013.01); *C02F 1/006* (2013.01); *C02F 1/283* (2013.01);
(Continued)

(58) Field of Classification Search
CPC .. C02F 9/20; C02F 1/003; C02F 1/006; C02F 1/283; C02F 1/444; C02F 2101/12; C02F 2101/20; C02F 2101/203; C02F 2101/322; C02F 2201/005; C02F 2301/043; C02F 2303/04; C02F 1/001;

C02F 2101/22; C02F 2307/10; B67D 1/1202; B67D 1/0081; B67D 1/07; B67D 2001/0093; B67D 2210/0001; B67D 2210/00047; B01D 35/1573; B01D 35/30
See application file for complete search history.

(56) References Cited

U.S. PATENT DOCUMENTS 10,689,281 B2 * 6/2020 Raymont ................ C02F 1/001
2008/0210315 A1 * 9/2008 Harrison ................ C02F 1/008
137/551
2019/0193007 A1 6/2019 Sharma et al.

FOREIGN PATENT DOCUMENTS

CN 1223160 A * 7/1999 ............. C02F 1/003
DE 102010038928 2/2012
(Continued)

OTHER PUBLICATIONS

English Translation of CN-1223160-A (Year: 1999).*
(Continued)

*Primary Examiner* — Terry K Cecil
(74) *Attorney, Agent, or Firm* — Fish & Richardson P.C.

(57) ABSTRACT

A water purification apparatus includes a water intake configured to receive water to the water purification apparatus, a filter part including a plurality of filters configured to filter the water and generate purified water, a water outlet including a plurality of water outlet ports configured to discharge the purified water, and one or more pipes that define a water purification path configured to guide the water from the water intake through at least one of the plurality of filters to thereby provide the purified water to at least one of the plurality of water outlet ports.

15 Claims, 8 Drawing Sheets

(51) Int. Cl.

| | |
|---|---|
| *C02F 1/28* | (2023.01) |
| *C02F 1/44* | (2023.01) |
| *C02F 101/12* | (2006.01) |
| *C02F 101/20* | (2006.01) |
| *C02F 101/32* | (2006.01) |

(52) U.S. Cl.

CPC .......... *C02F 1/444* (2013.01); *C02F 2101/12* (2013.01); *C02F 2101/20* (2013.01); *C02F 2101/203* (2013.01); *C02F 2101/322* (2013.01); *C02F 2201/005* (2013.01); *C02F 2301/043* (2013.01); *C02F 2303/04* (2013.01)

(56) References Cited

FOREIGN PATENT DOCUMENTS

| | | |
|---|---|---|
| KR | 20-1999-0006732 | 2/1999 |
| KR | 10-2002-0020426 A | 3/2002 |
| KR | 20100116310 | 11/2010 |
| KR | 10-2013-0006005 | 1/2013 |
| KR | 10-2013-0033469 | 4/2013 |
| KR | 10-2014-0085826 | 7/2014 |
| KR | 101700932 | 2/2017 |
| KR | 10-2017-0133198 A | 12/2017 |
| KR | 10-2018-0045757 | 5/2018 |
| KR | 10-2018-0111169 | 10/2018 |
| KR | 20210085385 | 7/2021 |
| KR | 10-2022-0000647 | 1/2022 |
| WO | WO 2013/065358 | 5/2013 |
| WO | WO 2014/038826 | 3/2014 |

OTHER PUBLICATIONS

Extended Search Report in European Appln. No. 22191169.6, mailed on Mar. 31, 2023, 7 pages.

Third Party Observations in European Appln. No. 22191169.6, mailed on Aug. 11, 2023, 3 pages.

International Search Report in International Appln. No. PCT/KR2022/011880, mailed on Nov. 18, 2022, 3 pages.

Third Party Observations in Korean Appln. No. 10-2022-0011667, mailed on Jan. 9, 2025, 2 pages.

\* cited by examiner

WATER PURIFIER

CROSS-REFERENCE TO RELATED APPLICATIONS

This application claims the benefit of Korean Patent Application No. 10-2022-0011667, filed on Jan. 26, 2022, in the Korean Intellectual Property Office, the disclosure of which is incorporated herein in its entirety by reference.

TECHNICAL FIELD

This disclosure relates to a water purification apparatus that purifies water and supplies purified water to users, and one particular implementation relates to a water purification apparatus that supplies purified water to a user through an external apparatus.

BACKGROUND

Various appliances using water are provided in the kitchen, such as a dishwasher, a water purifier refrigerator, an under sink type water purifier, and a desk type water purifier. In some cases, the home appliances may perform a water purification process, respectively, where each home appliance has a water filter for the water purification process.

In some cases, where the water filter may require continuous management such as periodic replacement, as the number of home appliances including filters increase, the management may become not systematic and the replacement cost may increase.

Further, since each home appliance may include a space to install a water filter, the size of the home appliance may be increased, which may lead to limitations in product design.

In some cases, where several home appliances are used, the water filters, used in each home appliance, may not be compatible with each other, which causes inconvenience in maintenance and repair.

In some cases, a water purification apparatus may serve as a hub for collectively supplying purified water to several home appliances. When a water purification apparatus serving as a hub purifies water and supplies it to several home appliances, there may be an advantage in that each home appliance may not include a separate water filter.

The level or requirements for water purification performed by each home appliance, connected to the water purification apparatus, may be different in many cases.

In some cases, where the hub-type water purification apparatus provides high-level purified water to all home appliances, which may lead to rapid exhaustion of the filter, and it may be difficult to generate a sufficient amount of purified water.

SUMMARY

The present disclosure describes a water purification apparatus that can reduce the process of management arising from the increasing number of household appliances individually equipped with water filters to provide or use purified water.

The present disclosure further describes a water purification apparatus that can provide the same quality level of water.

The present disclosure further describes a water purification apparatus that can provide water purified to a level suitable for each purpose.

The present disclosure further describes a water purification apparatus that can provide a sufficient amount of purified water to each appliance.

According to one aspect of the subject matter described in this application, water purification apparatus includes a water intake configured to receive water to the water purification apparatus, a filter part including a plurality of filters configured to filter the water and generate purified water, a water outlet including a plurality of water outlet ports configured to discharge the purified water, and one or more pipes that define a water purification path configured to guide the water from the water intake through at least one of the plurality of filters to thereby provide the purified water to at least one of the plurality of water outlet ports.

Implementations according to this aspect can include one or more of the following features. For example, the one or more pipes define a plurality of water purification paths that include a first water purification path that connects the water intake to any one of the plurality of water outlet ports, and a second water purification path that connects the water intake to another one of the plurality of water outlet ports. In some examples, the first water purification path is configured to guide the water from the water intake through a first portion of the plurality of filters, and the second water purification path is configured to guide the water from the water intake through a second portion of the plurality of filters that is different from the first portion of the plurality of filters. In some examples, the first portion of the plurality of filters and the second portion of the plurality of filters can include at least one common filter among the plurality of filters. The at least one common filter can include a plurality of parallel filters that are arranged in parallel, where the first water purification path and the second water purification path can branch at a point downstream relative to the plurality of parallel filters.

In some implementations, the plurality of filters can include (i) a first filter configured to filter residual chlorine, volatile organic compounds (VOCs), a first particulate matter having a first size or larger, rust residue, and a suspended matter, a second filter configured to filter residual chlorine, VOCs, (ii) a second particulate matter having a second size or larger, rust residues, a suspended matter, and heavy metals, the second size being smaller than the first size, and (iii) a third filter configured to filter a third particulate matter having a third size or larger, bacteria, and virus, the third particulate matter being smaller than the second size.

In some examples, the plurality of water outlet ports can include a first water outlet port, a second water outlet port, and a third water outlet port. The first water purification path can be configured to guide, to the second water outlet port, water having passed through the second filter, and the second water purification path can be configured to guide, to the third water outlet port, water having passed through the second filter and the third filter. The plurality of water purification paths can further include a third water purification path configured to guide, to the first water outlet port, water having passed through the first filter. In some examples, the first water purification path and the second water purification path can include a common part.

In some implementations, the water purification apparatus can include a first valve configured to distribute water from the second filter to the third filter or to the second water outlet port. In some implementations, the water purification apparatus can further include a second valve configured to distribute water from the water intake to the second filter or to the first filter.

In some examples, the first filter is disposed between the water intake and the second filter, and the water purification apparatus can further include a third valve configured to distribute water from the first filter to the second filter or to the first water outlet port. In some examples, the second filter can be one of a plurality of second filters that are the plurality of parallel filters. In some examples, the plurality of second filters can have filter component ratios that are different from one another.

In some implementations, the filter part can further include a head connected to an end of one of the plurality of filters, where the one or more pipes includes an internal pipe connected to the head. In some examples, external shapes of the plurality of filters can be identical to one another.

In some implementations, the water purification apparatus can be configured to be connected to a plurality of external apparatuses via external pipes. In some examples, the first water purification path can be connected to one of the plurality of external apparatuses, and the second water purification path can be connected to another of the plurality of external apparatuses.

In some implementations, the plurality of water outlet ports can include a first water outlet port configured to be connected to a first external apparatus among the plurality of external apparatuses, a second water outlet port configured to be connected to a second external apparatus among the plurality of external apparatuses, and a third water outlet port configured to be connected to a third external apparatus among the plurality of external apparatuses. The plurality of filters can include a first filter, a second filter, and a third filter that are connected to one another through the one or more pipes. The first water purification path can be configured to guide, to the first water outlet port, water having passed through the second filter, and the second water purification path can be configured to guide, to the third water outlet port, water having passed through the second filter and the third filter. The plurality of water purification paths can further include a third water purification path configured to guide, to the first water outlet port, water having passed through the first filter.

In some examples, the first filter can be configured to filter residual chlorine, volatile organic compounds (VOCs), a first particulate matter having a first size or larger, rust residue, and a suspended matter. The second filter can be configured to filter residual chlorine, VOCs, a second particulate matter having a second size or larger, rust residues, a suspended matter, and heavy metals, the second size being smaller than the first size. The third filter can be configured to filter a third particulate matter having a third size or larger, bacteria, and virus, the third particulate matter being smaller than the second size.

In some examples, there is provided a water purification apparatus connected to a plurality of external apparatuses, the water purification apparatus including a water intake, a filter part including a plurality of filter units, a water outlet including a plurality of water outlet ports through which water purified by the filter part is discharged from the water purification apparatus, and a pipe part forming a water purification path so that water introduced through the water intake passes through at least one of the plurality of filter units and is discharged to the water outlet. Thus, the water purification apparatus may serve as a hub for providing purified water to a plurality of external apparatuses.

In some examples, there is provided the water purification apparatus, wherein a water purification path connected from the water intake to any one of the plurality of water outlet ports may be different from another water purification path connected from the water intake to another one of the plurality of water outlet ports. Thus, several types of water with different levels of purification may be supplied.

In some examples, there is provided the water purification apparatus, wherein the plurality of filter units may include a first filter unit that filters residual chlorine, volatile organic compounds (VOCs), a particulate matter having a first size or larger than the first size, rust residue and a suspended matter, a second filter unit that filters residual chlorine, VOCs, a particulate matter having a second size or larger than the second size but smaller than the first size, rust residues, a suspended matter and heavy metals, and a third filter unit that filters a particulate matter having a third size or larger than the third size but smaller than the second size, bacteria and virus. Thus, excellent water purification performance may be achieved.

In some examples, there is provided the water purification apparatus, wherein the plurality of water outlet ports may include a wash water outlet port, a cooking water outlet port and a drinking water outlet port, and wherein a water purification path corresponding to the wash water outlet port may pass through the first filter unit, a water purification path corresponding to the cooking water outlet port may pass through the second filter unit, and a water purification path corresponding to the drinking water outlet port may pass through the second filter unit and the third filter unit. Furthermore, there is provided the water purification apparatus, wherein the water purification path corresponding to the cooking water outlet port and the water purification path corresponding to the drinking water outlet port may share at least a part. Thus, a sufficient water supply flow rate may be ensured through the minimum filter units.

In some examples, there is provided the water purification apparatus further including a first valve that may distribute water that passed through the second filter unit to the third filter unit or to the cooking water outlet port, or there is provided the water purification apparatus further including a second valve that may distribute water introduced into the water purification apparatus to the second filter unit or to the first filter unit. Thus, the flow rate of water may be appropriately adjusted according to a purpose.

In some examples, there is provided the water purification apparatus, wherein the second filter unit may be provided in plurality and the plurality of second filter units may be arranged in parallel to form a water purification path. Thus, sufficient water flow may be provided.

In some examples, there is provided the water purification apparatus, wherein the plurality of second filter units may have different filter component ratios. Thus, variable occurrences may be actively dealt with.

In some examples, there is provided the water purification apparatus, wherein the filter part may further include a head to which an end of a filter unit is coupled to, and an internal pipe part may be connected to the head. Therefore, the filter unit may be easily attached and detached, and the head may be used as a part of a water purification path, so that the water purification path may be easily formed.

In some examples, provided is a hub-type water purification apparatus that supplies purified water to a plurality of external apparatuses, and thus there is no need to provide a separate filter structure for each external apparatus.

In some examples, by providing the hub-type water purification apparatus, miniaturization and design freedom of each external apparatus may be increased.

In some examples, by providing the hub-type water purification apparatus, it is convenient to manage only the water filter of the water purification apparatus.

In some examples, the hub-type water purification apparatus may respond to external apparatuses to provide purified water of various properties.

In some examples, by providing a plurality of water purification paths that selectively use a plurality of water filters provided in the hub-type water purification apparatus, a water purification performance suitable for a purpose may be exhibited, and a sufficient flow rate of supplied water may be secured by avoiding an unnecessary water purification process.

In some examples, by providing a pre-treatment filter in which water is primarily purified before passing through a main water filter, the reliability of water purification may be increased and the lifespan of the subsequent water filter may be increased.

Further scope of applicability will become apparent from the following detailed description. However, since various changes and modifications within the spirit of scope would be clearly understood by those skilled in the art, it should be understood that the detailed description and specific implementations, such as example implementations, are given as examples only.

DETAILED DESCRIPTION

Figure 1:
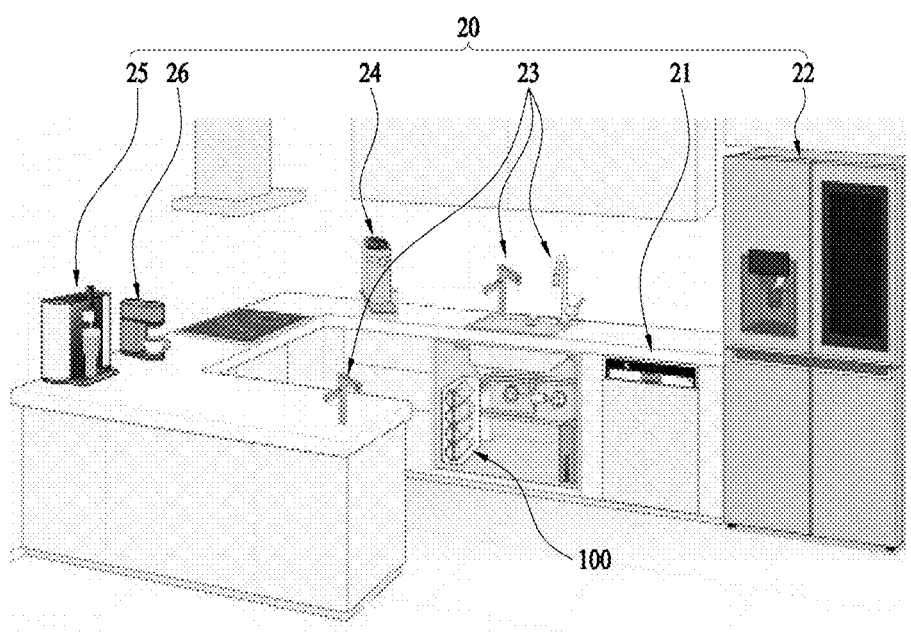
FIG. 1 illustrates an example of a kitchen including an example of a water purification apparatus.

Hereinafter, the example implementations disclosed herein will be described in detail with reference to the accompanying drawings, but regardless of a reference numeral in drawing, the same or similar components refer to the same reference numeral, and redundant description thereof will be omitted.

FIG. 1 illustrates an example of a kitchen including an example of a water purification apparatus 100.

In some cases, a plurality of household appliances may perform water purification by having their own water filter. In the present disclosure, the water purification apparatus 100 can collectively perform water purification and supply purified water to a plurality of home appliances.

In some implementations, the water purification apparatus 100 can receive water from an external water supply line (which can be the first water supply line supplied to each home from outside the building) and can perform a water purification process, and the water undergone the water purification process through the water purification apparatus 100 can be supplied to various home appliances in the kitchen. That is, the water purification apparatus 100 can be connected to a plurality of home appliances at the same time, and function as a hub that provides purified water to each home appliance.

For example, the water purification apparatus 100 can be simultaneously connected to at least one of a dishwasher 21, a water purifier refrigerator 22, an under sink type water purifier 23 (which refers to a water purifier provided with a filter structure installed in the internal space under the sink), a desk type water purifier 24 (which refers to an integrated water purifying apparatus that is placed on the kitchen counter shelf), a home brewing machine 25 and a coffee machine 26. The water purification apparatus 100 is not limited thereto, and can be applied to any apparatus providing purified water. The water purification apparatus 100 can be connected to a washing apparatus, a cooking apparatus and an apparatus for drinking, based on usage. An apparatus, which the water purification apparatus 100 as described above is connected to, and receives purified water from the water purification apparatus 100, is defined as an external apparatus 20.

The water purification apparatus 100 can be connected to each external apparatus 20 through an external pipe. There is no restriction on the shape of the external pipe. For example, the external pipe can be provided in the form of a rubber hose or a metal pipe. The external pipe can be provided as a set of individual lines connecting the water purification apparatus 100 and each external apparatus 20 one-to-one. Each external apparatus 20 can include a port for connecting an external pipe. The port can be exposed to the outside of the external apparatus 20 and provided to be easily fastened, or the port can be provided so as not to impair the appearance of the external apparatus 20 by being covered by a cover.

The water purification apparatus 100 can also include at least one port for being individually connected to each external apparatus. A plurality of ports of the water purification apparatus 100 can be individually connected to each external apparatus 20. Each port can have a fixing structure to prevent an external pipe from being unintentionally pulled out.

The water purification apparatus 100 can be provided with as many ports as types of purified water. For example, when the water purification apparatus 100 provide three types of water for washing, cooking and drinking, the water purification apparatus 100 can be provided with a first water outlet port (e.g., wash water outlet port), a second water outlet port (e.g., cooking water outlet port), and a third water outlet portion (e.g., drinking water outlet port). When it is desired to connect a plurality of external apparatuses 20 to one drinking water outlet port, one port of the water purification apparatus 100 and a plurality of ports of the external apparatuses 20 can be connected one-to-many, using a branched external pipe.

The water purification apparatus 100 can be mounted in a space below the sink (see FIG. 1). When the water purification apparatus 100 is provided in the space under the sink, the water purification apparatus 100 can be provided close to the water supply line supplied to the home and located close to the faucet provided in the sink, thereby minimizing the length of the external pipe, and there is an advantage that the water purification apparatus 100 is not exposed to the outside. In addition, since the water purification apparatus 100 can be provided close to the external apparatus 20 provided in the sink, the flow rate and water pressure drop of the external apparatus 20 provided in the sink is also minimized.

Further, the water purification apparatus 100 can be provided in a desk shape to be mounted on a workbench in the kitchen. The water purification apparatus 100 in desk type can have a relatively high degree of freedom in arrangement, and the desk type water purification apparatus 100 has an advantage in that the kitchen countertop does not have a hole through which a pipe passes or the hole can be minimized, unlike the form provided in the space under the sink. Further, the desk type water purification apparatus 100 has an advantage in that it is easy to access from the outside and thus maintenance and repair are easy. For example, since the water purification apparatus 100 supplies a large amount of purified water to a plurality of external apparatuses 20, the filter replacement cycle is also shortened and yet, it is easy to replace the filter, and it is also effective to monitor the state of the water purification apparatus 100.

Figure 2:
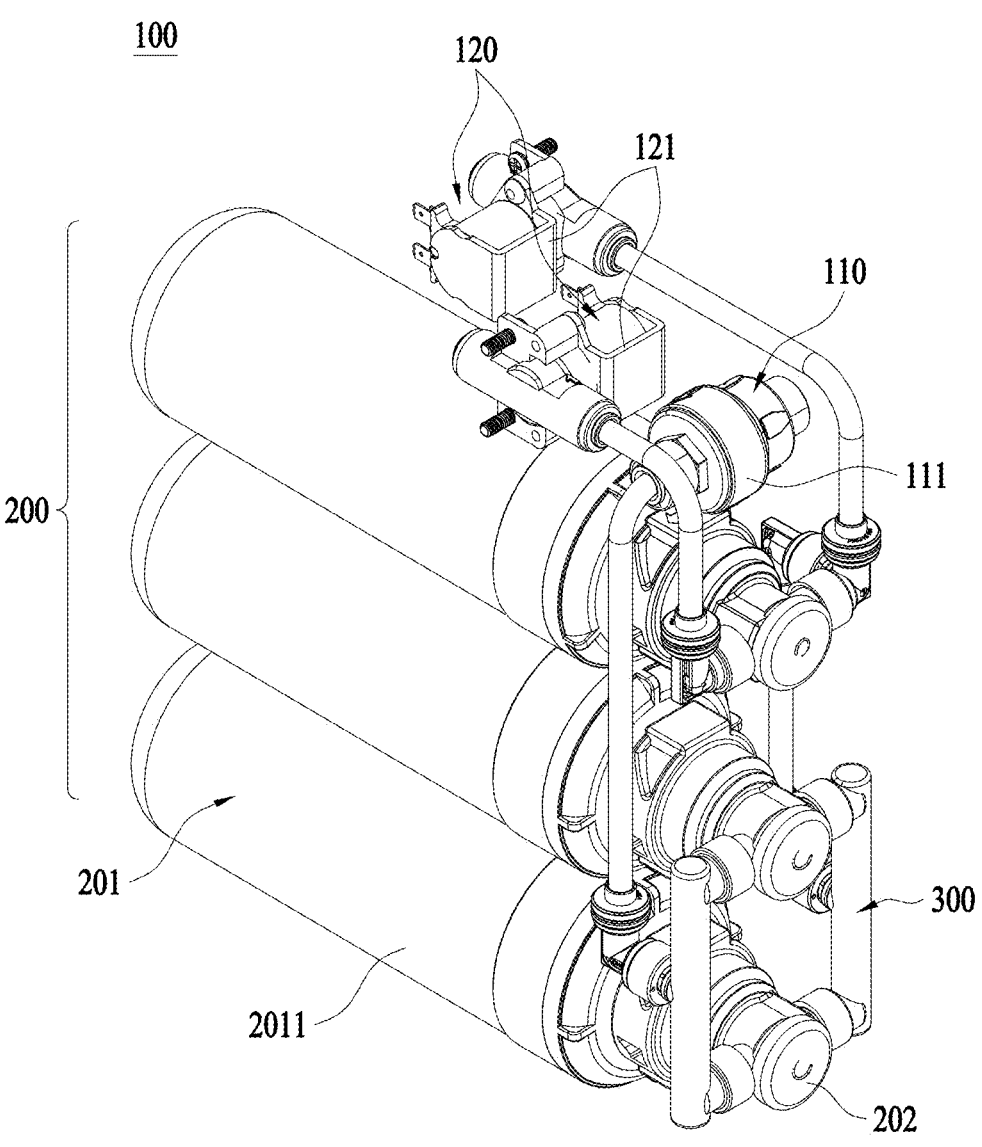
FIG. 2 illustrates an example of the water purification apparatus.

FIG. 2 illustrates an example of the water purification apparatus 100.

The water purification apparatus 100 includes a water intake 110 through which water is introduced into the water purification apparatus 100 through a water supply line supplied from the outside, a filter part 200 in which water introduced through the water intake 110 is purified, and a water outlet 120 through which water purified by the filter part 200 is discharged to each external apparatus 20.

The water purification apparatus 100 includes a port connected to a water supply line and a port connected to an external pipe. The former is a water inlet port 111 of the water intake 110, and the latter is a water outlet port 121 of the water outlet.

The water inlet port 111 is generally provided as a single, but in some examples, the water inlet port 111 can be provided in plurality. When a plurality of water inlet ports 111 are provided, water can be supplied from various paths, so that the total purified water supply amount of the water purification apparatus 100 can be increased. Or, there is an advantage that the water purification process can be performed by receiving water in various states that need to be separated.

The water inlet port 111 or the water outlet port 121 can have a structure coupled to an external pipe. The fastening structure can be provided in a screw coupling method, which is easy to secure fastening reliability.

The water inlet port 111 or the water outlet port 121 can include a sealing structure for preventing water leakage when connected to an external pipe. The sealing structure can include a member such as a rubber ring.

The filter part 200 includes a filter 201 including a filter structure for water purification, and a plurality of filters 201 can be provided. Each filter 201 can be replaced individually.

The filters 201 can perform different functions depending on the structure and components of the filters mounted therein or arrangement in the filter part 200. In some cases, the filters 201 having the same specifications can be provided in the same or equivalent arrangement, to perform the same function.

The filter 201 includes a filter case 2011 having a filter structure mounted therein. The filter case 2011 can have the same shape regardless of the function of the filter 201.

The filter part 200 includes a head 202 and an internal pipe 300. The filter 201 can be fixed to the head 202. The internal pipe 300 forms a water purification path through which water flows in the water purification apparatus 100 together with the filters 201 and the heads 202. The internal pipe 300 can connect the head 202 and the head 202, the head 202 and the water inlet port 111, and the head 202 and the water outlet port 121. The head 202 forming an intake path through which water to be purified is introduced into the filter 201 together with the internal pipe 300, or an outlet path through which water is discharged from the filter 201.

In some examples, the head 202 can be configured to be coupled regardless of the type according to the function of the filter 201. In some examples, the head 202 can be provided to be coupled with only a predetermined filter 201.

Compatibility between the filter 201 and the head 202 may or may not be implemented in at least one side of the head 202 or the filter 201.

For example, when a manufacturer of the water purification apparatus 100 restricts the use to freely select the type of filter 201 and not be able to use it, the water purification apparatus 100 can be provided such that only the specified filter 201 is coupled to the predetermined head 202. The incompatibility can be implemented in a physical way to make it impossible to engage with the head 202 if it is not the required filter 201. For example, the head 202 and the filter 201 can have a mutually engaged shape only between components in which coupling is allowed. Alternatively, coupling of the head 202 and the filter 201 can be implemented in an electronic manner through a method of recognizing a mark such as a barcode provided in the filter 201.

In some cases, when a manufacturer of the water purification apparatus 100 allows a user to freely select and use the type of the filter 201, all the heads 202 and the filters 201 are implemented in the same engaging shape so that the user can implement the filter arrangement as desired. In this case, since compatibility between the filters 201 and the heads 202 can be maximized, various constitutions of the water purification method are possible and productivity can be increased.

In some implementations, an apparatus case can define the exterior of the water purification apparatus 100, and a space in which a component such as the filter part 200 are mounted. The water inlet port 111 and the water outlet port 121 can be provided exposed on the outer surface of the apparatus case.

The filter 201 provided in the water purification apparatus 100 can be divided into several types according to a filtering target. For example, the filter 201 can include a first filter 201A, a second filter 201B and a third filter 201C.

For example, the first filter 201A can filter residual chlorine, volatile organic components (VOCs) and relatively large particulate matters, for example, particles of 5 μm or larger, rust residues, and suspended matters. The first filter 201A can include a carbon block (which can include activated carbon and a binder) and a nonwoven fabric as filter materials for performing the function.

The second filter 201B can filter residual chlorine, VOCs and particulate matters having a relatively medium size, for example, particles of 3 μm or larger, rust residues, suspended matters and heavy metals. The heavy metals filterable by the second filter 201B can include, for example, mercury, iron, lead, copper, cadmium, aluminum, arsenic, manganese, zinc, chromium and selenium. In particular, the second filter 201B can have a stronger performance than the first filter 201A in filtering VOCs. For example, the VOCs that can be filtered by the second filter 201B can include chloroform, which is a disinfection by-product. The second filter 201B can include a carbon block (which can include activated carbon, a binder and a functional material) and nonwoven fabric as filter materials for performing the function. The functional materials can be iron hydroxide, titanium oxide and an ion exchange resin.

The third filter 201C can filter particulate matters having a relatively small size, for example, particles of 0.2 μm or larger, bacteria and viruses. Bacteria filtered by the third filter 201C can be, for example, *E. coli, Staphylococcus aureus* and *Pseudomonas aeruginosa*. In addition, a virus filtered by the third filter 201C can be a norovirus. The third filter 201C can include a carbon block (which can include activated carbon), an ultrafiltration (UF) membrane and a positively charged membrane as filter materials for performing the function.

The water purification apparatus 100 can use the first filter 201A to purify water for washing. The wash water can be defined as water purified enough to wash dishes.

The water purification apparatus 100 can use the second filter 201B to purify water for cooking. The cooking water can be defined as water used for washing fruits, vegetables and rice, used for cooking rice, or used for boiling soup or ramen.

The water purification apparatus 100 can use the second filter 201B and the third filter 201C to purify water for drinking. The drinking water can be defined as water that can be readily consumed by humans.

The first filter 201A to the third filter 201C can be selectively combined to purify water to be any one of the wash water, the cooking water and the drinking water. At least one filter 201 forms a water purification path together with the head 202, the internal pipe 300, the water inlet port 111 and the water outlet port 121. That is, the water purification apparatus 100 starts from one water inlet port 111 and forms an individual water purification path leading to any one of a plurality of water outlet ports 121, and the individual water purification path can form a plurality of water purification paths as a whole. The individual water purification path can be provided differently from each other. Water that passed through differently provided paths can be used for different purposes. Due to the characteristics, the water purification apparatus 100 can serve as a hub by simultaneously supplying water from a single apparatus to external apparatuses 20 for various purposes (of washing, cooking and drinking).

The water purification apparatus 100 can further include a storage that can store purified water. The storage can provide a plurality of spaces according to the type of purified water.

Further, the water purification apparatus 100 can further include a temperature controlling part that can supply hot or cold water by heating or cooling water stored in the storage. The temperature controlling part can be configured to independently heat or cool each space of the storage so that purified water is used according to the purpose.

FIGS. 3 to 8 are conceptual diagrams of some examples of water purification paths of the water purification apparatus 100.

The internal pipe 300 can connect the water inlet port 111 and the filter 201, and connect the water outlet port 121 and the filter 201. Further, the internal pipe 300 can be connected to each other.

Water introduced into the water purification apparatus 100 through the water inlet port 111 is purified through the filter 201, and the purified water is discharged from the water purification apparatus 100 through the water outlet port 121 and suppled to the external apparatus 20.

The head 202 serves as a node connecting the filter 201 and the internal pipe 300. When the filter 201 is fastened to the head 202, an inlet and an outlet of the filter 201 can communicate with the internal pipe 300 by the head 202.

The water purification apparatus 100 can include a valve 410. The valve 410 can be provided at at least one point in the water purification path to control the flow of water. For example, the valve 410 can be connected to a plurality of outlet pipes 300 or can be connected to a plurality of inlet pipes 300 to control the flow of water. For example, the valve 410 can control water to pass through only any one of a plurality of water purification paths formed by the plurality of outlet pipes 300 or the inlet pipes 300, control water to pass through all of the multiple paths, or control water pass through none of the paths. As the valve 410 performing the functions, the valve 410 can be a solenoid valve 410. To this end, the valve 410 can be provided at a point where the internal pipe 300 is branched toward different water purification paths.

Figure 3:
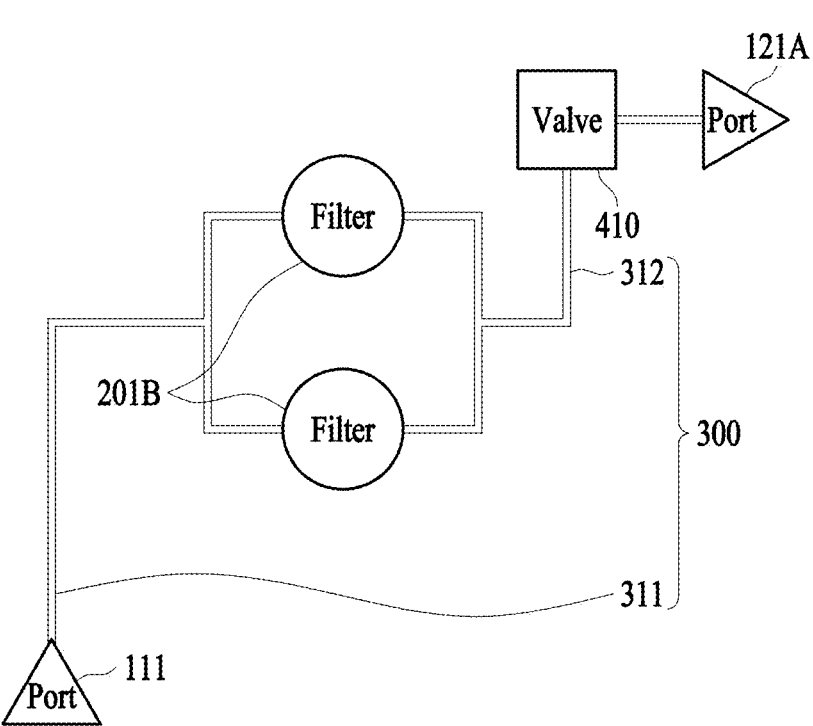
FIGS. 3 to 5 are conceptual diagrams showing examples of water purification paths of the water purification apparatus.

Referring to FIG. 3, the water purification apparatus 100 can form a water purification path corresponding to a cooking water outlet port 121A.

A 1-1 internal pipe 311 can connect the water inlet port 111 and the second filter 201B, and a 1-2 internal pipe 312 can connect the water outlet port 121 and the second filters 201B. Water introduced from the outside through the water inlet port 111 is purified through the second filters 201B and purified as cooking water, and the purified cooking water is supplied to the external apparatus 20 through the cooking water outlet port 121A.

The valve 410 can be provided at one point of the 1-2 internal pipe 312. The valve 410 can control the amount of purified water that pass through the second filters 201B to be discharged to the cooking water outlet port 121A, or can determine whether to discharge the water.

In order to supply a sufficient amount of cooking water, a plurality of the second filters 201B can be arranged in parallel. Since filter members in the filters 201 reduce the flow rate of water, there can be a problem that a sufficient amount of water is not supplied to a user, and the second filters 201B arranged in parallel can provide a bandwidth as wide as the number provided, thereby increasing the flow rate of water simultaneously proceeding. For example, two second filters 201B can be arranged in parallel. The number of the second filters 201B can be increased or decreased according to the flow rate.

Further, FIG. 3 shows only a plurality of second filters 201B arranged in parallel, but a plurality of the first filters 201A or a plurality of the third filters 201C also can be arranged in parallel.

Filter materials inside the second filter 201B can be composed of the carbon block (which can include activated carbon, a binder and a functional material) and the nonwoven fabric as described above.

The plurality of second filters 201B connected in parallel can have the same component ratio of the filter materials, but in some cases, plurality of second filters 201B can have different component ratios. For example, one second filter 201B on one side can include more activated carbon than the other second filter 201B on the other side, with less functional materials whereas the other second filter 201B on the other side can include less activated carbon and more functional materials. In this way, when the second filters 201B have different component ratios, in securing flow rate and water purification performance above a certain level, the possibility of occurrence of variables can be reduced.

Figure 4:
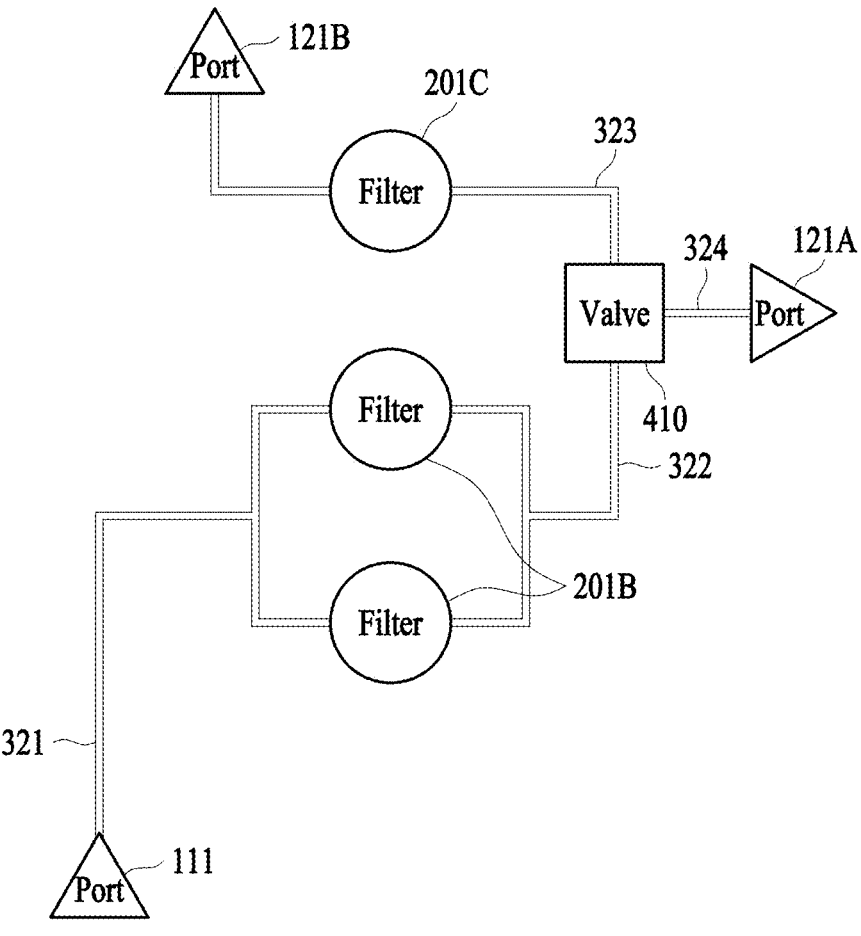

Referring to FIG. 4, the water purification apparatus 100 can form water purification paths corresponding to the cooking water outlet port 121A and a drinking water outlet port 121B.

A 2-1 internal pipe 321 can connect the water inlet port 111 and the second filters 201B. The 2-1 internal pipe 321 can be branched at one point to be connected to the two second filters 201B as in the case of FIG. 3.

Water purified by passing through the two second filters 201B is combined at one point of a 2-2 internal pipe 322 and branched again, the purified water can flow into the third filter 201C through a 2-3 internal pipe 323 and goes to the drinking water outlet port 121B, or can be introduced to the cooking water outlet port 121A through a 2-4 internal pipe 324. That is, water passing through the second filters 201B and the third filter 201C becomes drinking water, and water passing through the second filters 201B becomes cooking water.

The valve 410 can be provided at a point branching from the 2-2 internal pipe 322 to the 2-3 internal pipe 323 (corresponding to the drinking water outlet port 121B) and the 2-4 internal pipe 324 (corresponding to the cooking water outlet port 121A).

The valve 410 can allow water that passes through the second filters 201B to flow into the third filter 201C, can direct water to the cooking water outlet port 121A, can direct water to the both filters 201B and 201C, or can prevent water from being directed to the both filters 201B and 201C. Accordingly, the water purification apparatus 100 can selectively supply at least one of cooking water and drinking water, or can supply none of cooking water and drinking water.

In some implementations, in the water purification apparatus 100, water purification paths are formed independently or share only some parts, and water is purified through the filter 201 for the purpose, and thus a decrease in flow rate due to the filter 201 can be minimized.

The water purification apparatus 100 can have the effect of minimizing the number of filters 201 by sharing the filters 201. That is, when the filters 201 are not shared, the second filter 201B for purifying water for cooking and the second filter 201B for drinking water may be separately provided, and in this case, there is a disadvantage in that the volume and the weight of the water purification apparatus 100 increase.

The above effect of the water purification apparatus 100 sharing at least a part of the water purification path applies not only to the examples implementations but also to example implementations to be described later. Further, the features described in the example implementations can be identically applied within a range that is not contradicted or otherwise described in the example implementations to be described later.

Figure 5:
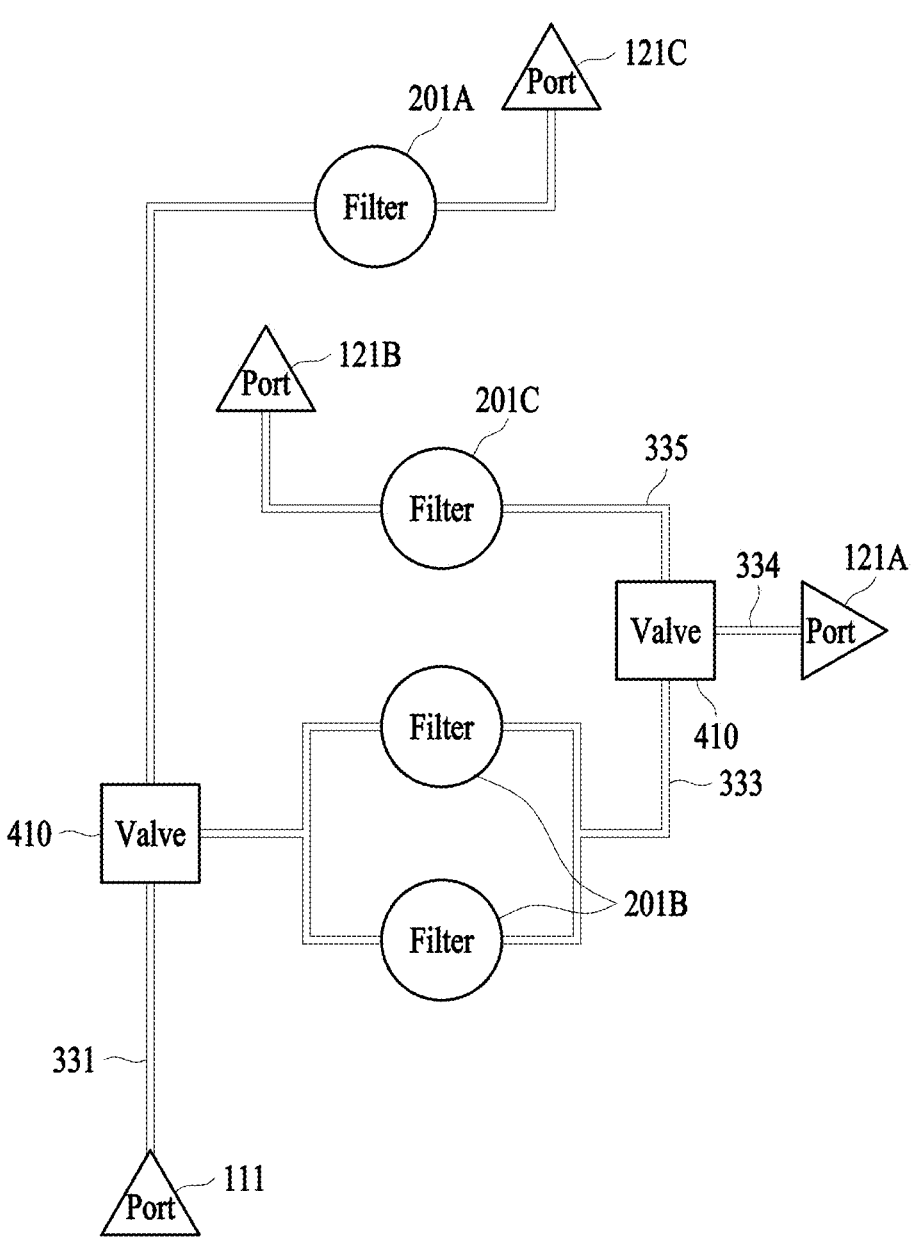

Referring to FIG. 5, the water purification apparatus 100 can form water purification paths corresponding to the cooking water outlet port 121A, the drinking water outlet port 121B and a wash water outlet port 121C.

Unlike the example implementations related to FIGS. 3 and 4, water introduced into the water purification apparatus 100 can be directed to the first filter 201A or the second filter 201B selectively or simultaneously. When water is directed to the first filter 201A, the water is discharged to the wash water outlet port 121C and provided as wash water. When water only passes through the second filters 201B, the water is discharged to the cooking water outlet port 121A and provided as cooking water. When water passes the second filters 201B and the third filter 201C, the water can be discharged to the drinking water outlet port 121B and provided as drinking water.

The water purification apparatus 100 can include the valve 410 so that water introduced into the water purification apparatus 100 can be directed to the first filter 201A or the second filters 201B. In addition, the water purification apparatus 100 can include the valve 410 so that water passing through the second filters 201B can be directed to the third filter 201C or the cooking water outlet port 121A.

Water introduced into the water purification apparatus 100 through the water inlet port 111 can pass through a 3-1 internal pipe 331 and flow into the first filter 201A, and can be discharged to the wash water outlet port 121C. Alternatively, water introduced into the water purification apparatus 100 through the water inlet port 111 can pass through a 3-2 internal pipe 332 and flow into the second filters 201B, and the water can be introduced into the valve through a 3-3 internal pipe 333. The water branched from the valve 410 can be discharged to the cooking water outlet port 121A through a 3-4 internal pipe 334, or the water branched from the valve 410 can be discharged to the drinking water outlet port 121B through the third filter 201C through a 3-5 internal pipe 335.

Figure 6:
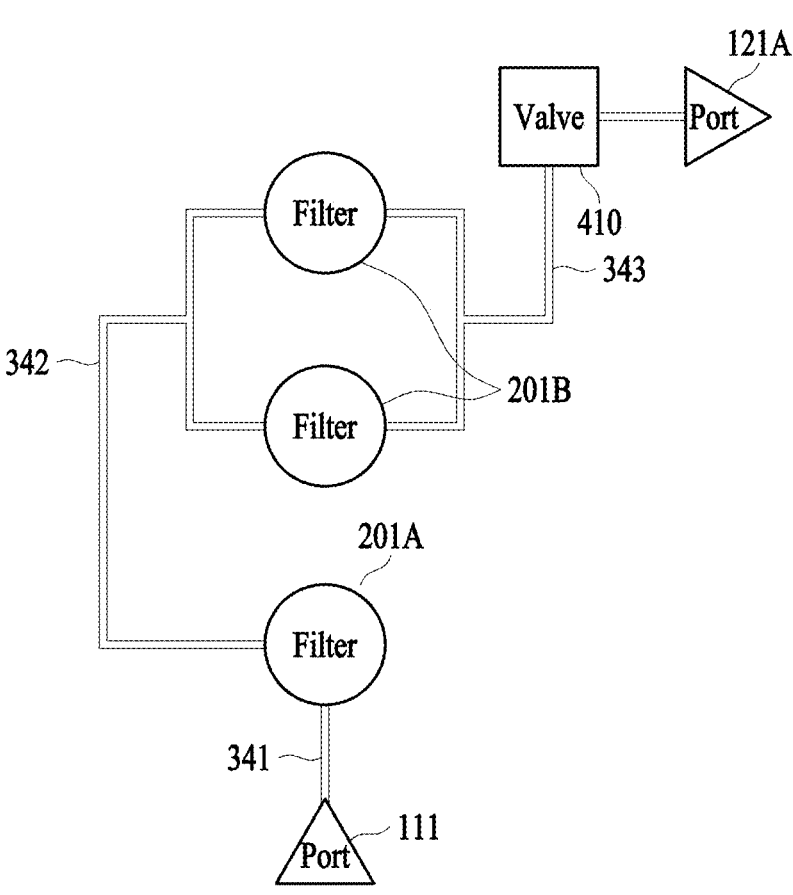
FIGS. 6 to 8 are conceptual diagrams showing examples of water purification paths of the water purification apparatus.
Figure 7:
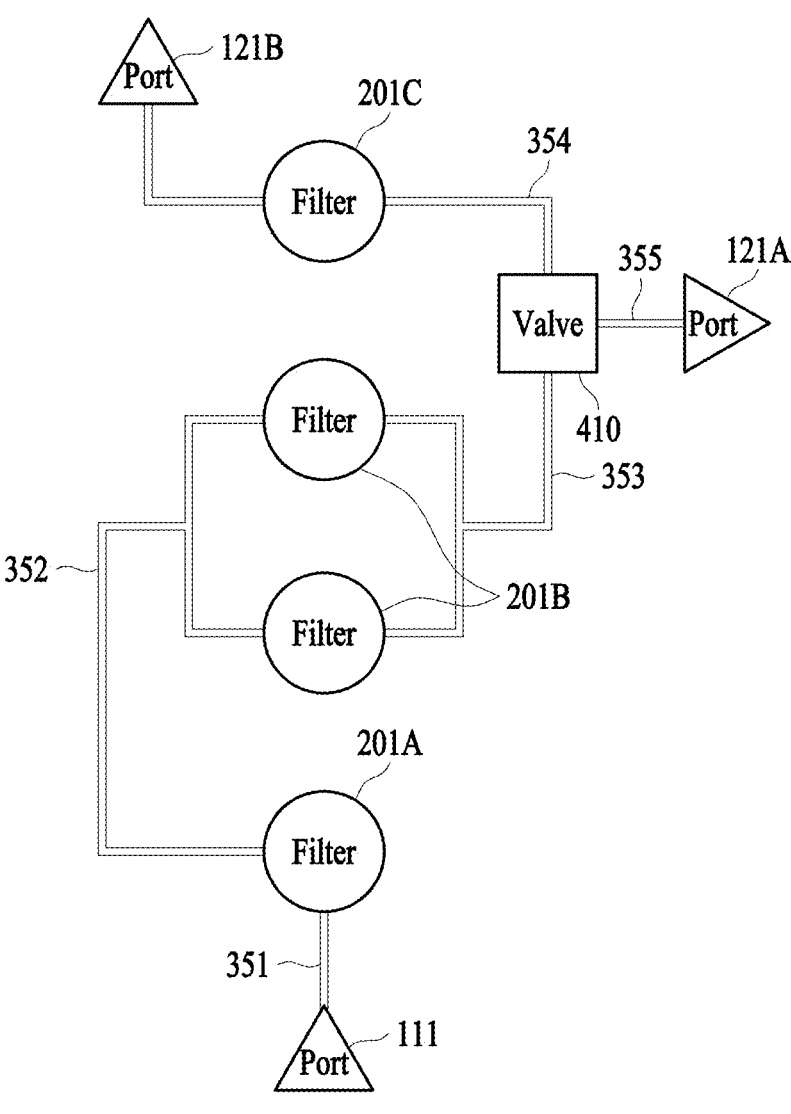
Figure 8:
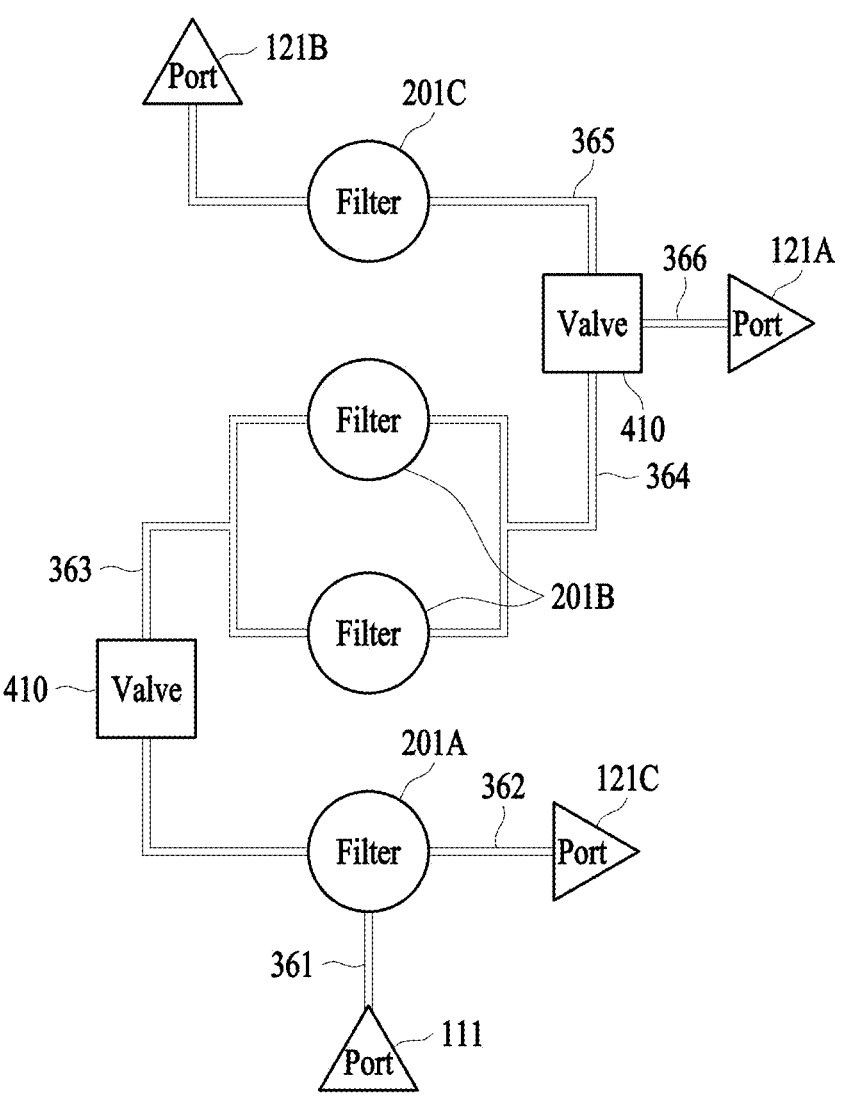

FIGS. 6 to 8 are conceptual diagrams of some example implementations of water purification paths of the water purification apparatus 100. There is difference in that the first filter 201A used to purify water to be wash water described with regard to FIGS. 3 to 5 is also used as a pre-processing filter of the second filters 201B or the third filter 201C in the example implementations of FIGS. 6 to 8. That is, the first filter 201A is used for discharging not only wash water but also cooking water or drinking water. By using the first filter 201A as a pre-processing filter, large particles and rust flowing into the water purification apparatus 100 from the outside can be primarily filtered, and this prevents the problem in advance that the filter 201 of the next stage is clogged and also prevents the problem of a sudden decrease in flow rate.

Referring to FIG. 6, water introduced into the water purification apparatus 100 through the water inlet port 111 flows into the first filter 201A through a 4-1 internal pipe 341. Water that primarily purified through the first filter 201A flows into the second filters 201B through a 4-2 internal pipe 342. Two of the second filters 201B can be arranged in parallel as in the previous example implementations. Water purified through the second filters 201B can be discharged as cooking water to the cooking water outlet port 121A through a 4-3 internal pipe 343. The valve 410 can be provided at a point of the 4-3 internal pipe 343 to determine whether purified water is discharged or the degree of discharge.

Referring to FIG. 7, water introduced into the water purification apparatus 100 through the water inlet port 111 flows into the first filter 201A through a 5-1 internal pipe 351. Water that has been primarily purified through the first filter 201A flows into the second filters 201B through a 5-3 internal pipe 352. Two of the second filters 201B can be arranged in parallel as in the previous example implementations. Water introduced through the second filters 201B can pass through a 5-3 internal pipe 353 and proceed to at least one of branched a 5-4 internal pipe 354 and a 5-5 internal pipe 355, When water flows through the 5-4 internal pipe 354, the water passes through the third filter 201C and the water is discharged to the drinking water outlet port 121B to be used as drinking water. When water flows through the 5-5 internal pipe 355, the water is discharged to the cooking water outlet port 121A and used as cooking water.

Referring to FIG. 8, water introduced into the water purification apparatus 100 through the water inlet port 111 flows into the first filter 201A through a 6-1 internal pipe 361. Water that primarily purified through the first filter 201A can selectively proceed to a 6-2 internal pipe 362 or a 6-3 internal pipe 363 by the on-off operation of the valve 410. When the primarily purified water proceeds to the 6-2 internal pipe 362, the water is discharged to the wash water outlet port 121C and used as wash water, and when the primarily purified water proceeds to the 6-3 internal pipe 363, the water flows into the second filters 201B. Two of the second filters 201B can be arranged in parallel as in the previous example implementations. The water purified through the second filters 201B passes through a 6-4 internal pipe 364 and proceeds to at least one of branched a 6-5 internal pipe 365 and a 6-6 internal pipe 366. When water proceeds to the 6-5 internal pipe 365, the water is discharged to the drinking water outlet port 121B through the third filter 201C to be used as drinking water. When water flows through the 6-6 internal pipe 366, the water is discharged to the cooking water outlet port 121A and used as cooking water.

It is apparent to those skilled in the art that the present disclosure can be implemented in other specific forms without departing from the spirit and essential characteristics.

The above detailed description should not be construed as restrictive in all respect and should be considered as illustrative. The scope should be determined by a reasonable interpretation of the appended claims, and all modifications within the equivalent scope are included in the scope.

What is claimed is:

1. A water purification apparatus comprising:
a water intake configured to receive water to the water purification apparatus;
a filter part comprising a plurality of filters configured to filter the water and generate purified water;
a water outlet including a plurality of water outlet ports configured to discharge the purified water; and
one or more pipes that define a water purification path configured to guide the water from the water intake through at least one of the plurality of filters to thereby provide the purified water to at least one of the plurality of water outlet ports,
wherein the one or more pipes define a plurality of water purification paths comprising:
a first water purification path that connects the water intake to any one of the plurality of water outlet ports, the first water purification path being configured to guide the water from the water intake through a first portion of the plurality of filters, and
a second water purification path that connects the water intake to another one of the plurality of water outlet ports, the second water purification path being configured to guide the water from the water intake through a second portion of the plurality of filters that is different from the first portion of the plurality of filters,
wherein the first portion of the plurality of filters and the second portion of the plurality of filters include at least one common filter among the plurality of filters,
wherein the at least one common filter comprises a plurality of parallel filters that are arranged in parallel,
wherein the first water purification path and the second water purification path branch at a point downstream relative to the plurality of parallel filters,
wherein the plurality of parallel filters include same filter materials, and
wherein a component ratio of the filter materials in one of the plurality of parallel filters is different from a component ratio of the filter materials in another of the plurality of parallel filters.

2. The water purification apparatus of claim 1, wherein the plurality of filters comprise:
a first filter configured to filter residual chlorine, volatile organic compounds (VOCs), a first particulate matter having a first size or larger, rust residue, and a suspended matter;

a second filter configured to filter residual chlorine, VOCs, a second particulate matter having a second size or larger, rust residues, a suspended matter, and heavy metals, the second size being smaller than the first size; and
a third filter configured to filter a third particulate matter having a third size or larger, bacteria, and virus, the third particulate matter being smaller than the second size.

3. The water purification apparatus of claim 2, wherein the plurality of water outlet ports comprise:
a first water outlet port;
a second water outlet port; and
a third water outlet port,
wherein the first water purification path is configured to guide, to the second water outlet port, water having passed through the second filter,
wherein the second water purification path is configured to guide, to the third water outlet port, water having passed through the second filter and the third filter, and
wherein the plurality of water purification paths further comprise a third water purification path configured to guide, to the first water outlet port, water having passed through the first filter.

4. The water purification apparatus of claim 3, wherein the first water purification path and the second water purification path include a common part.

5. The water purification apparatus of claim 4, further comprising a first valve configured to distribute water from the second filter to the third filter or to the second water outlet port.

6. The water purification apparatus of claim 5, further comprising a second valve configured to distribute water from the water intake to the second filter or to the first filter.

7. The water purification apparatus of claim 2, wherein the first filter is disposed between the water intake and the second filter, and
wherein the water purification apparatus further comprises a valve configured to distribute water from the first filter to the second filter or to one of the plurality of water outlet ports.

8. The water purification apparatus of claim 2, wherein the second filter is one of a plurality of second filters that are the plurality of parallel filters.

9. The water purification apparatus of claim 8, wherein the plurality of second filters have filter component ratios that are different from one another.

10. The water purification apparatus of claim 1, wherein the filter part further comprises a head connected to an end of one of the plurality of filters, and
wherein the one or more pipes comprises an internal pipe connected to the head.

11. The water purification apparatus of claim 10, wherein external shapes of the plurality of filters are identical to one another.

12. The water purification apparatus of claim 1, wherein the water purification apparatus are configured to be connected to a plurality of external apparatuses via external pipes.

13. The water purification apparatus of claim 12, wherein the first water purification path is connected to one of the plurality of external apparatuses, and
wherein the second water purification path is connected to another of the plurality of external apparatuses.

14. The water purification apparatus of claim 12, wherein the plurality of water outlet ports comprise:

a first water outlet port configured to be connected to a first external apparatus among the plurality of external apparatuses;

a second water outlet port configured to be connected to a second external apparatus among the plurality of external apparatuses; and a third water outlet port configured to be connected to a third external apparatus among the plurality of external apparatuses, wherein the plurality of filters include a first filter, a second filter, and a third filter that are connected to one another through the one or more pipes, wherein the first water purification path is configured to guide, to the second water outlet port, water having passed through the second filter, wherein the second water purification path is configured to guide, to the third water outlet port, water having passed through the second filter and the third filter, and wherein the plurality of water purification paths further comprise a third water purification path configured to guide, to the first water outlet port, water having passed through the first filter.

15. The water purification apparatus of claim 14, wherein the first filter is configured to filter residual chlorine, volatile organic compounds (VOCs), a first particulate matter having a first size or larger, rust residue, and a suspended matter, wherein the second filter is configured to filter residual chlorine, VOCs, a second particulate matter having a second size or larger, rust residues, a suspended matter, and heavy metals, the second size being smaller than the first size, and wherein the third filter is configured to filter a third particulate matter having a third size or larger, bacteria, and virus, the third particulate matter being smaller than the second size.

\* \* \* \* \*